United States Patent
Ouderkirk et al.

(10) Patent No.: US 9,885,903 B2
(45) Date of Patent: Feb. 6, 2018

(54) DISPLAY DEVICE COMPRISING A FIRST PIXEL GROUP AND A SECOND PIXEL GROUP EACH INCLUDING AT LEAST THREE CONTIGUOUSLY ARRANGED PIXELS

(71) Applicant: 3M INNOVATIVE PROPERTIES COMPANY, St. Paul, MN (US)

(72) Inventors: Andrew J. Ouderkirk, St. Paul, MN (US); Kelly Reed Ingham, Singapore (SG)

(73) Assignee: 3M Innovative Properties Company, St. Paul, MN (US)

( * ) Notice: Subject to any disclaimer, the term of this patent is extended or adjusted under 35 U.S.C. 154(b) by 256 days.

(21) Appl. No.: 14/350,503

(22) PCT Filed: Oct. 3, 2012

(86) PCT No.: PCT/US2012/058522
§ 371 (c)(1),
(2) Date: Apr. 8, 2014

(87) PCT Pub. No.: WO2013/055549
PCT Pub. Date: Apr. 18, 2013

(65) Prior Publication Data
US 2014/0267987 A1    Sep. 18, 2014

Related U.S. Application Data
(60) Provisional application No. 61/564,049, filed on Nov. 28, 2011.

(30) Foreign Application Priority Data
Oct. 11, 2011 (SG) .................................. 201107417

(51) Int. Cl.
G02F 1/1335 (2006.01)
G02F 1/167 (2006.01)

(52) U.S. Cl.
CPC .. *G02F 1/133514* (2013.01); *G02F 1/133533* (2013.01); *G02F 1/133536* (2013.01); *G02F 1/167* (2013.01)

(58) Field of Classification Search
CPC ..................... G02F 1/133536; G02F 1/133533
See application file for complete search history.

(56) References Cited

U.S. PATENT DOCUMENTS 6,066,357 A    5/2000  Tang et al.
6,147,934 A    11/2000 Arikawa
(Continued)

FOREIGN PATENT DOCUMENTS

CN    101123257    2/2008
CN    101271218    9/2008
(Continued)

OTHER PUBLICATIONS

International Search Report for PCT International Application No. PCT/US2012/058522, dated Jan. 3, 2013, 3pgs.
(Continued)

*Primary Examiner* — Paul Lee
(74) *Attorney, Agent, or Firm* — Gregg H. Rosenblatt

(57) ABSTRACT

A display device comprising a Spatial Light Modulator assembly including active display elements for displaying an image, a patterned color layer including at least one color pixel array, a reflector for reflecting ambient incident light, and a light absorbing layer, wherein the color pixel array comprises a first pixel group including at least three contiguously arranged pixels capable of transmitting a first
(Continued)

color, and a second pixel group including at least three contiguously arranged pixels capable of transmitting a second color.

8 Claims, 4 Drawing Sheets

(56)  References Cited

U.S. PATENT DOCUMENTS

| | | | |
|---|---|---|---|
| 6,288,172 | B1 | 9/2001 | Goetz |
| 8,362,987 | B2 | 1/2013 | Gally et al. |
| 2003/0165085 | A1 | 9/2003 | Brewer |
| 2004/0169807 | A1* | 9/2004 | Rho ................. G02F 1/133514 349/139 |
| 2005/0134769 | A1 | 6/2005 | Mi |
| 2005/0162600 | A1 | 7/2005 | Rho et al. |
| 2006/0232727 | A1 | 10/2006 | Yun |
| 2008/0309852 | A1 | 12/2008 | O'Donnell |
| 2009/0122476 | A1* | 5/2009 | Won ................. G02F 1/133308 361/679.21 |
| 2009/0179842 | A1* | 7/2009 | Chen ................. G02F 1/133514 345/88 |
| 2009/0316070 | A1* | 12/2009 | Hwang ............ G02F 1/133536 349/62 |
| 2010/0020272 | A1 | 1/2010 | Kim |
| 2010/0128209 | A1* | 5/2010 | Lee ................... G02F 1/133512 349/106 |
| 2011/0085224 | A1 | 4/2011 | Addington |
| 2011/0149177 | A1 | 6/2011 | Takata |
| 2011/0222149 | A1 | 9/2011 | Saito |
| 2012/0113367 | A1 | 5/2012 | Kitson et al. |

FOREIGN PATENT DOCUMENTS

| | | |
|---|---|---|
| CN | 101639583 | 2/2010 |
| KR | 2009-0072146 | 7/2009 |
| WO | WO 2005-064389 | 7/2005 |

OTHER PUBLICATIONS

Chinese Search Report for Chinese application No. 201280049807.3, dated May 28, 2016, 2pgs.

Taiwanese Search Report for Taiwan application No. 101137359, dated May 16, 20161pg.

* cited by examiner

DISPLAY DEVICE COMPRISING A FIRST PIXEL GROUP AND A SECOND PIXEL GROUP EACH INCLUDING AT LEAST THREE CONTIGUOUSLY ARRANGED PIXELS

FIELD OF TECHNOLOGY

This description relates to a display device, particularly a color display device, and a display panel incorporating the display device.

BACKGROUND

Active matrix Spatial Light Modulated displays (SLM) include Liquid Crystal Displays (LCD), electrophoretic displays (EPD), electrowetting displays, cholesteric displays, addressable compressible photonic crystals (such as described in KR20090072146), and Micro Electro-Mechanical System displays (MEMS). These displays operate in one of three illumination modes: backlit, reflective, and transflective which is a combination of backlit and reflective illumination modes. Reflective and transflective illumination modes involve the use of the SLM to reflect ambient light in order to display an image, without the use of a backlight. Advantageously, the displayed image can be viewed easily under bright conditions, while power consumption is significantly lower than backlit display devices.

Color image formation using active matrix SLM currently present challenges for reflective and transflective illumination modes. A patterned color matrix comprising a repeating array of red, green and blue color pixels are typically used to provide a color display. However, as light passes through the color matrix layers and the electrodes associated with each layer, degradation of light quality and parallax issues may result. Ongoing research and development is focused on providing a patterned color matrix capable of providing acceptable image quality.

A need therefore exists for color reflective displays that have high brightness and contrast under bright ambient lighting, including direct sunlight, that can be inexpensively manufactured and can display good quality images.

SUMMARY OF THE INVENTION

In one aspect, a display device comprises a SLM assembly including active display elements for displaying an image and a patterned color layer including at least one color pixel array, wherein the color pixel array comprises a first pixel group including at least three contiguously arranged pixels capable of transmitting a first color, and a second pixel group including at least three contiguously arranged pixels capable of transmitting a second color. In other aspects, a vehicle instrument panel comprising the display device is provided.

In another aspect, a spatial light modulator includes a regular pixel array, wherein the pixel array includes at least one row having an array of switchable electrodes regularly distributed on a switchable electrode panel. A first color covers at least two adjacent pixels and a second color covers at least two additional adjacent pixels in an individual row.

These and other aspects are described in the detailed description below. In no event should the above summary be construed as a limitation on the claimed subject matter, which is defined solely by the claims as set forth herein.

BRIEF DESCRIPTION OF THE DRAWINGS

Throughout the specification, reference is made to the appended drawings, where like reference numerals designate like elements, wherein.

The figures are not necessarily to scale. However, it will be understood that the use of a numeral to refer to a component in a given figure is not intended to limit the component in another figure labeled with the same number.

DETAILED DESCRIPTION

Certain displays, such as those for motorcycle or car instrument panels, require color, but the portions requiring color are located at specific areas of the display, and the image graphics may be simple. Images to be projected include numbers, alphabets, symbols, or simple graphical gauges. For example, in the case of a motorcycle or a car, the velocity and Revolutions Per Minute (RPM) display may be represented by black color for normal RPM ranges, and red color for excessive RPM. Black may be displayed if the black and/or the red ranges have a null value, e.g. when the vehicle is stationary. Other portions such as warning indicators, fuel gauges and the like, may likewise be indicated in black when normal, in red to indicate caution.

The inventors have found that a color display panel with excellent sunlight readability having areas of high brightness can be provided by incorporating a patterned color layer as described herein. Combining a high resolution active matrix display with color filters that contiguously covers adjacent pixels allows a combination of high display resolution with high color gamut and high brightness and efficiency. Furthermore, the color filter may be applied in such a way that the color filter pattern can be easily changed in manufacture, allowing low cost customized designs.

The high-efficiency display can provide a very compact and light-weight display system. This is important for displays in portable devices, and for larger, weight-sensitive applications. For example, this invention can reduce the center of gravity of motor vehicles and improve stability.

Figure 1:
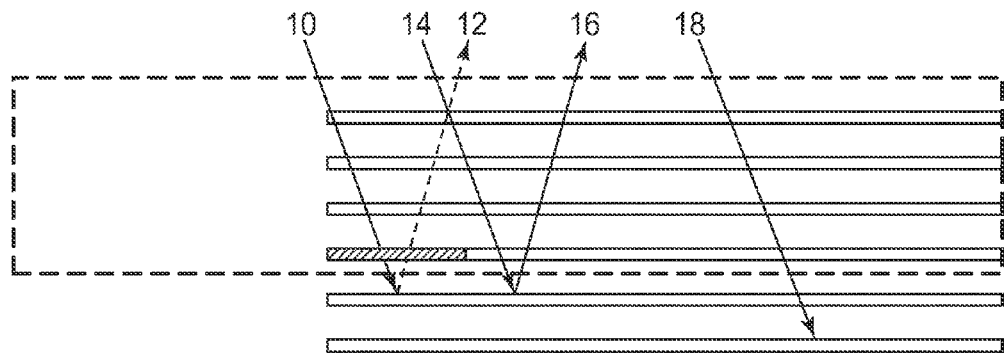
FIG. 1 is a cross-sectional view of an embodiment of a display device.

A cross sectional view of one embodiment is shown in FIG. 1. In this embodiment, the patterned color layer is interposed between the reflective polarizer and liquid crystal. The patterned color layer transmits a first color and a second color; black is displayed if the liquid crystal molecules are arranged to block the transmission of the reflected light. For example, light ray 10 of the first color is polarized by the absorbing polarizer, rotated by the liquid crystal layer, filtered by the color layer, reflected by the reflective polarizer, and emitted by the display as ray 12. Light ray 14 of the second color follows the same path, but is emitted by the display as ray 16, and is of the second color. Ray 18 is not rotated by the liquid crystal, and is transmitted by the reflective polarizer and at least partially absorbed by the absorbing layer.

Figure 2:
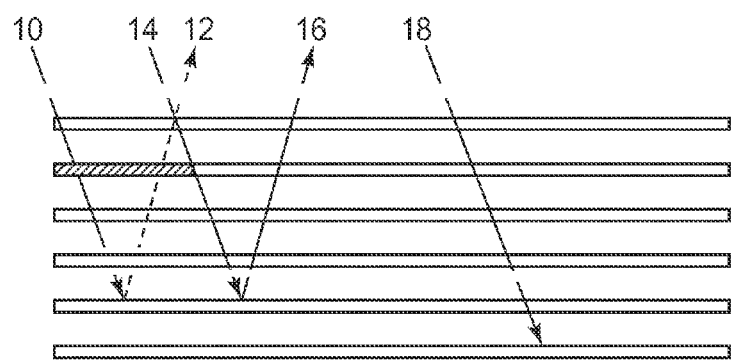
FIG. 2 is a cross-sectional view of another embodiment of the display device.

The order of the components in the liquid crystal module may be changed. For example, the patterned color layer may be located between the absorbing polarizer and the liquid crystal layer. The color layer similarly transmits a first color and a second color; black is displayed if incident light is absorbed by the absorbing layer. As shown in FIG. 2, light ray 10 of the first color is transmitted by the color layer, and subsequently filtered by the color layer in which the first color is transmitted. Subsequently, ray 10 is rotated by the liquid crystal layer, reflected by the reflective polarizer, and emitted by the display as ray 12. Light ray 14 of the second color follows the same path, but is emitted by the display as ray 16, and is of the second color. Ray 18 is not rotated by the liquid crystal, and is transmitted by the reflective polarizer and at least partially absorbed by the absorbing layer, resulting in black being displayed.

Figure 3:
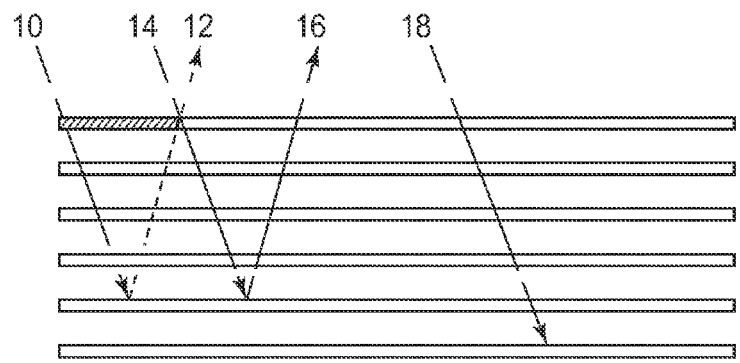
FIG. 3 is a cross-sectional view of another embodiment of the display device.

Alternatively, as shown in FIG. 3, the patterned color layer may be located above the absorbing polarizer. The color layer similarly transmits a first color and a second color. For example, light ray 10 of the first color is transmitted by the color layer, and subsequently polarized by the absorbing polarizer, rotated by the liquid crystal layer, reflected by the reflective polarizer, and emitted by the display as ray 12. Light ray 14 of the second color follows the same path, but is emitted by the display as ray 16, and is of the second color. Ray 18 is not rotated by the liquid crystal, and is transmitted by the reflective polarizer and at least partially absorbed by the absorbing layer.

Each color pixel array comprises a first pixel group including at least three contiguously arranged pixels capable of transmitting a first color, and a second pixel group including at least three contiguously arranged pixels capable of transmitting a second color.

Figure 4:
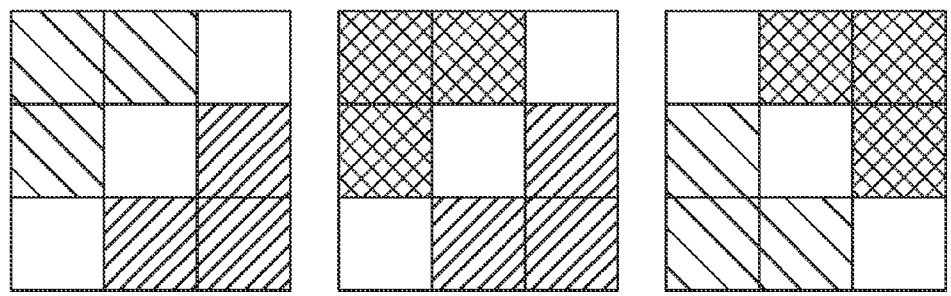
FIGS. 4, 5 and 6 are plane views of various embodiments of the color pixel array.

FIG. 4 shows the various embodiments of a color pixel array wherein each pixel group contains three pixels. The first example shows three green and three red pixel groups, the second example shows three blue and three red pixel groups and the third example shows three green and three blue pixel groups. A white pixel group may also be used. As seen from the figures, the three pixels of each pixel group are arranged contiguous to each other, or in other words, they are immediately adjacent to each other. In one embodiment, the pixels in each pixel group are arranged in an L-shaped format. In the context of this invention, diagonally adjacent pixels are not considered to be arranged contiguous to each other. While the pixels are contiguous over a portion of the row or column, they are not contiguous over all rows or columns making up the display.

The pixels within each pixel group are of substantially the same color. They preferably differ from each other by less than 0.2 units under the CIE 1931 standard, or more preferably less than 0.05 or less than 0.025 units.

Figure 5:
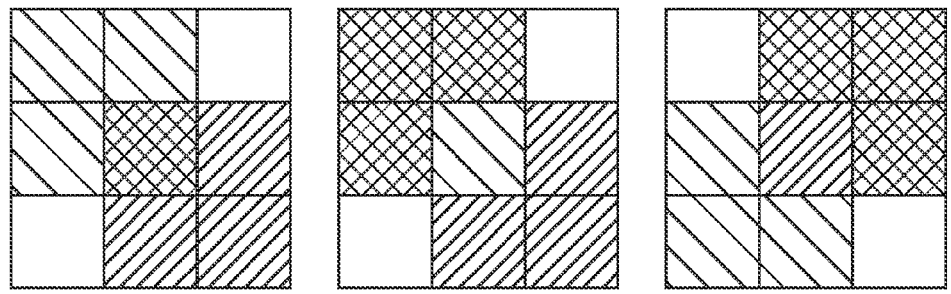
Figure 6:
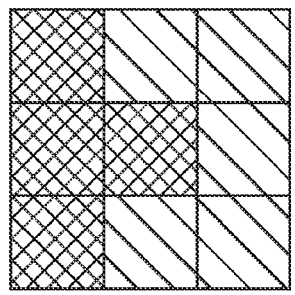
Figure 6:
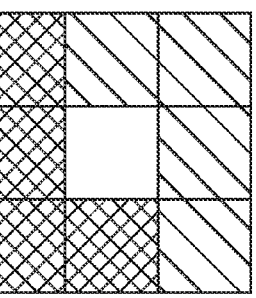

FIG. 5 shows an embodiment in which the color pixel array comprises three different color pixel groups. The third pixel group comprises one or more pixels of a third color. FIG. 6 shows other embodiments in which two pixel groups are present, each pixel group having four pixels.

The viewing range of the display can be improved by having one or more of the components scatter light. The adhesive layer may have a non-depolarizing, low backscatter diffusing component, such as spherical acrylic particles with a diameter between about 200 and 20,000 nm, and having a refractive index difference between the particle and the matrix of about 0.005 to about 0.030.

A suitable adhesive for attaching the layers together is described in U.S. Pat. No. 6,288,172. If the diffusing adhesive is located above the absorbing polarizer, the adhesive may significantly depolarize light, but should have a low back scatter. Preferably, backscatter is less than about 5%, more preferably, less than 2%, and most preferably, less than 1%. Alternatively, one or more of the surfaces from the upper surface of the reflective polarizer to the outermost surface of the display may diffuse light through one or a combination of surface roughness or coatings. If the scattering function is between the absorbing polarizer and the reflective polarizer, optionally, the scattering is accompanied with little depolarization. Also optionally, the depolarization from the coating or surface structure results in less than about 20% transmission when placed between crossed polarizers.

Figure 7:
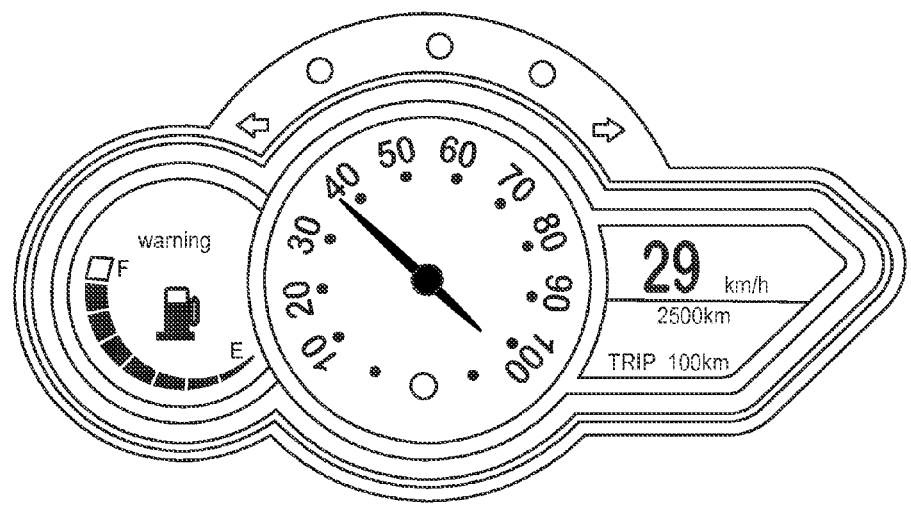
FIG. 7 is a vehicle instrument panel incorporating the display device.

FIG. 7 shows a vehicle instrument panel displaying two different colors of red and orange, while numerals and bars and other indicators are displayed in the typical LCD black/grey. This is a fixed pattern graphic on a fixed pattern LCD. A fixed pattern graphic may be placed on a Thin Film Transistor (TFT) active matrix LCD, allowing the display to have the cost and brightness of the fixed pattern LCD, but give a more dynamic display. The dynamic display can offer different information depending on the operation of the motorcycle. For example, the speedometer can indicate speed when the motor is running, and diagnostics such as service intervals, performance metrics such as average fuel consumption, and the like. In general, the liquid crystal assembly may comprise a standard TFT module, or a liquid crystal reflective display (for example, available from Pixel Qi Corp.) with no pixelated color filter in reflective mode, or a liquid crystal reflective display with no pixelated color filter in either reflective and transmissive modes. By using a TFT LCD, the LCD can be easily modified to work with new graphics, allowing variation within product lines and between customers, without requiring new LCD inventory.

The back absorbing layer can also emit light by, for example, partially transmitting light from a backlighting unit, and the adhesive, color absorbing layer, or the first surface of the reflective polarizer may diffusely scatter light.

Figure 8:
FIG. 8 is a side view of a row of pixels according to another aspect of the invention.

In another aspect of the invention, FIG. 8 shows a row of pixels from a SLM display, made from a regular SLM pixel array 20, having an arrangement of at least one row and at least one column, which is at least partially covered with a patterned color layer 22 having at least two regions of color, where the color covers at least three adjacent pixels. Exemplified in FIG. 8 is patterned color layer 22 having color areas 24, 26, 28, and 30. At least one of the color areas covers at least three adjacent pixels in the row. Equivalently, the color areas may cover at least three adjacent pixels in a column. Each of the colored areas may be red, green, blue, black, or clear, or any combination thereof. For example, a color layer may include red, grey, clear, and orange. The color layer may also include fluorescent or phosphorescent materials. One region of color may cover 3, 4, 5 or more adjacent pixels.

Figure 9:
FIG. 9 is a side view of a row of pixels according to another aspect of the invention.

FIG. 9 shows the color layer 22 and row of addressable pixels 20 with two adjacent pixels 32 that are in a transparent state, next to five adjacent pixels 34 that are in an opaque or semi opaque state.

Figure 10:
FIG. 10 is a side view of a row of pixels according to another aspect of the invention.

FIG. 10 shows a configuration where the spatial light modulators can be switched from one color to another or from one color to a clear state and 3, 4, 5 or more pixels of the same color are adjacent to each other. The colored regions making up the SLM 40 may include, for example, color region 42, 44, 46, and 48.

As an example of the display shown in FIG. 10, an electrophoretic display, such as described in U.S. Publication 2011-0085224, for example as described in FIG. 7 of that publication, may be formed into an array of columns and rows of dimensions R×C pixels, where both R and C are at least five. The pixels may be in one or more planes. Either the rows or columns, or both may be made with different ink colors, where at least 3 along the same row or column have adjacent pixels of the same ink color.

Figure 11:
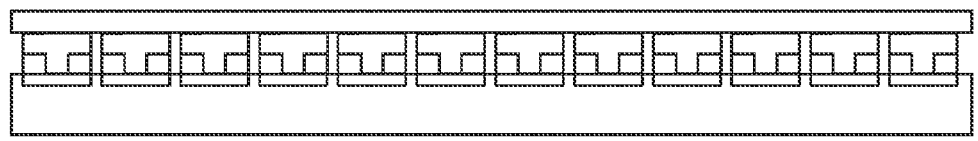
FIG. 11 is a side view of an exemplary row of an R×C display according to another aspect of the invention.

In another aspect of the invention, FIG. 11 shows an example of one row of an R×C dimensioned display. An array of switchable electrodes 52 are regularly distributed on a switchable electrode panel 50. Wells for ink 58, 60, and 62 are formed by a non-conducting dielectric structure 54. At least two different inks are used to define an individual row. Each color can cover at least two adjacent pixels. In this example, a first color 58 covers three adjacent pixels, an electrophoretic ink 60 covers five adjacent pixels, and an optional third ink covers four adjacent pixels. In operation, some or all of the adjacent pixels can be switched into a transmissive state or into an absorbing state.

An additional aspect of this invention is that the front portion of the panel may be covered with a solar reflective film as part of the outermost portion of an opaque graphic overlay to protect the display from overheating in direct sunlight. The solar reflective film can protect the display from overheating in direct sunlight. Overheating may cause the display to cease operating correctly, for example, at least some areas of an LCD display may exceed the clearing temperature, and make at least part of the display illegible until the temperature is reduced. Overheating may also degrade the optical films used in the display, particularly the polarizer and adhesive components. Having different regions of contiguous color can cause regional differences in the temperature of the display, and can result in excessive warping, distortion, and degradation of the display components. For example, a display having large regions of a colored area may reach substantially higher temperatures than clear areas of a display when illuminated by direct sunlight. Peak temperatures can be managed by combining the display with regional patterns of color with a coating or film that rejects part of the solar spectrum. For example, a coating may be applied to the front of the regionally patterned display, where the coating reflects IR light and transmits visible light.

A method of forming the display device will be described in the following. The front graphic is preferably made by the following steps:

1. Coating the first side of solar reflecting film, available from 3M Company, with an antiglare scratch resistant material. Suitable coatings are well known in the display industry.
2. Coating the second side of the solar reflective film with a graphic. The graphic may include a combination of transparent and colorless areas, transparent colored areas, and opaque graphics.
3. Laminating the second side of the printed solar reflecting film with an optically clear adhesive (OCA), available from 3M Company.
4. Preparing the LCD with an absorbing polarizer on one side, an LC without a color matrix, and a reflective display film (RDF, available from 3M Company) on the backside of the display.
5. Laminating the printed graphic onto the LCD.

Variations on this method of assembly include applying the graphics to the first side of the reflective polarizer, or any other surface between the first side of the reflective polarizer and the front side of the display. The color filter array in the LCM (Liquid Crystal Module) may also be patterned with the color and clear graphics. The pattern may also be split between different surfaces. Graphics may also be applied to the back side of the display, i.e., behind the reflective polarizer.

The back reflector may be a reflective polarizer with a black or colored coating on the second surface (RDF-B, available from 3M Company), a non-inverting or inverting transflective film (including TDF, available from 3M Company), or a partially reflective coating on the back surface of an absorbing polarizer. SLMs using non-polarized light such as electrophoretic displays can use reflectors such as titania particle filled coatings, voided polymer films, and reflective dielectric films such as ESR film available from 3M Company.

Transflective displays may be back lit with a light source, including electroluminescent lights, organic LED light sources, LEDs, and other light sources. Either reflective or transflective displays may also be illuminated from the front of the display, using for example, off-set light sources such as LEDs, or light guides designed for front illumination. The transflective display may also be a reflective display for certain colors (for example blue and green light) and transflective for other colors (for example red light).

The display may be partially or fully covered with a solar reflective film. Suitable solar reflective films include SRF, available from 3M Company. Preferably, the solar reflective film is at least 90% transparent average luminous response for 6500 K sunlight, and reflects at least 70% of IR light on average from 850 to at least 950 nm, both measured at normal angles to the film surface.

Although the present invention has been described with particular reference to preferred embodiments illustrated herein, it will be understood by those skilled in the art that variations and modifications thereof can be effected and will fall within the scope of this invention as defined by the claims thereto now set forth hereinbelow.

What is claimed is:

1. A display device comprising:
   a liquid crystal assembly including active display elements for displaying an image, wherein the liquid crystal assembly comprises a front side with an external-facing absorbing polarizer layer and a back side comprising an internal-facing liquid crystal layer;
   a patterned color layer disposed between the absorbing polarizer layer and the liquid crystal layer of the liquid crystal assembly, wherein the patterned color layer comprises at least one color pixel array comprising nine individual pixels arranged in a 3-rows-by-3-columns arrangement, and wherein the color pixel array comprises:
   a first pixel group including at least three contiguously arranged pixels, wherein the contiguously arranged pixels in the first pixel group are immediately adjacent to one another such that each pixel in the first pixel group has at least one edge contiguous with an edge of another pixel in the first pixel group, and wherein the pixels in the first pixel group are substantially the same color and are capable of transmitting a first color, and
   a second pixel group including at least three contiguously arranged pixels, wherein the contiguously arranged pixels in the second pixel group are immediately adjacent to one another such that each pixel in the second pixel group has at least one edge contiguous with an edge of another pixel in the second pixel group, and wherein the pixels in the second pixel group are substantially the same color and are capable of transmitting a second color different from the first color;

a reflective polarizer for reflecting ambient incident light transmitted through the patterned color layer, wherein the reflective polarizer has a first major surface and a second major surface, the first major surface of the reflective polarizer facing the patterned color layer; and a light absorbing layer on the second major surface of the reflective polarizer, wherein the light absorbing layer comprises a black or colored coating.

2. The display device of claim 1, wherein the color pixel array further comprises a third pixel group, wherein the pixels in the third pixel group are substantially the same color and include at least one pixel capable of transmitting a third color different from the first and the second colors.

3. The display device of claim 2, wherein the at least three contiguously arranged pixels of the first, second and/or third pixel group are arranged in an L-shape.

4. The display device of claim 1, wherein the first pixel group includes four contiguously arranged pixels, and the second pixel group includes four contiguously arranged pixels.

5. A display device comprising:
a liquid crystal assembly including active display elements for displaying an image, wherein the liquid crystal assembly comprises a front side with an external-facing absorbing polarizer layer and a back side comprising an internal-facing liquid crystal layer;
a patterned color layer disposed on the absorbing polarizer layer of the liquid crystal assembly, wherein the patterned color layer comprises at least one color pixel array comprising nine individual pixels arranged in a 3-rows-by-3-columns arrangement, and wherein the color pixel array comprises:
a first pixel group including at least three contiguously arranged pixels of substantially the same color and capable of transmitting a first color, wherein the contiguously arranged pixels in the first pixel group are immediately adjacent to one another such that each pixel in the first pixel group has at least one edge contiguous with an edge of another pixel in the first pixel group, and
a second pixel group including at least three contiguously arranged pixels of substantially the same color and capable of transmitting a second color different from the first color, wherein the contiguously arranged pixels in the second pixel group are immediately adjacent to one another such that each pixel in the second pixel group has at least one edge contiguous with an edge of another pixel in the second pixel group, and;
a reflective polarizer for reflecting ambient incident light transmitted through the patterned color layer, wherein the reflective polarizer has a first major surface and a second major surface, the first major surface of the reflective polarizer facing the patterned color layer; and
a light absorbing layer on the second major surface of the reflective polarizer, wherein the light absorbing layer comprises a black or colored coating.

6. The display device of claim 5, wherein the color pixel array further comprises a third pixel group of substantially the same color and including at least one pixel capable of transmitting a third color different from the first and the second colors.

7. The display device of claim 6, wherein the at least three contiguously arranged pixels of the first, second and/or third pixel group are arranged in an L-shape.

8. The display device of claim 5, wherein the first pixel group includes four contiguously arranged pixels, and the second pixel group includes four contiguously arranged pixels.

* * * * *